3,767,714
PROCESS FOR PREPARING CHLOROSTYRENES
Naoya Kominami, Tokyo, Nobuhiro Tamura, Saitama, and Etsuo Yamamoto, Tokyo, Japan, assignors to Asahi Kasei Kogyo Kabushiki Kaisha, Osaka, Japan
No Drawing. Filed Apr. 30, 1970, Ser. No. 33,497
Claims priority, application Japan, May 14, 1969, 44/36,584; June 24, 1969, 44/49,317; June 28, 1969, 44/50,732
Int. Cl. C07c 25/28
U.S. Cl. 260—650 R    15 Claims

ABSTRACT OF THE DISCLOSURE

Mono-, di- and tri-chlorostyrenes, which are useful as monomers for the production of polymers and as curing agents for fiber-reinforced plastics, are prepared in one step with high yields by reacting a corresponding mono-, di- or tri-chlorobenzene with ethylene and an oxygen-containing gas in the presence of a palladium salt of fatty acid with or without an alkali salt of fatty acid.

---

This invention relates to a process for preparing chlorostyrenes, i.e. styrenes having a chlorine substituent in at least one of the o-, m- and p-positions.

Chlorostyrenes are extremely useful as monomers for the production of polymers or copolymers and as curing agents for fiber-reinforced plastics. Heretofore, the chlorostyrenes have been prepared according to a process carried out by chlorinating an ethylbenzene to a chlorophenylethyl chloride having chlorine atoms in the nucleus and the side chain, and then hydrolyzing and dehydrating the side chain. In view of yields, steps and starting materials, however, the above-mentioned process is not desirable for commercial scale practice.

An object of the present invention is to provide a process for preparing chlorostyrenes in one step with high yields from ethylene and chlorobenzenes.

Another object of the invention is to provide a process for preparing chlorostyrenes according to which process the expensive catalyst used can be recycled effectively.

In accordance with the present invention, a mono-, di- or tri-chlorostyrene can be selectively prepared according to the following reaction equation:

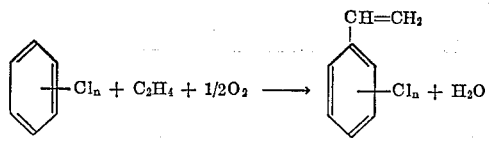

wherein $n$ is 1, 2 or 3.

This reaction is carried out in the presence of a palladium salt of fatty acid or a mixture thereof with an alkali salt of fatty acid.

The starting chlorobenzenes include monochlorobenzene, o-dichlorobenzene, m-dichlorobenzene, p-dichlorobenzene, 1,2,3 - trichlorobenzene, 1,2,4 - trichlorobenzene and 1,3,5-trichlorobenzene. These chlorobenzenes may be used in the form of mixtures.

The reaction products are such that o- and p-chlorostyrenes are obtained from monochlorobenzene; 3,4-dichlorostyrene from o-dichlorobenzene; 2,4-dichlorostyrene from m-dichlorobenzene; 2,5-dichlorostyrene from p-dichlorobenzene; 3,4,5-trichlorostyrene from 1,2,3-trichlorobenzene; 2,4,5-trichlorostyrene from 1,2,4-trichlorobenzene; and 2,4,6-trichlorostyrene from 1,3,5-trichlorobenzene. From the mixtures of the starting materials, there are obtained corresponding chlorostyrene.

The molar ratio of ethylene to oxygen ($C_2H_4/O_2$) is in the range of 10 to $1/100$. The ethylene and oxygen can be diluted with an inert gas such as nitrogen or carbon dioxide.

The palladium salt of fatty acid, which is the catalyst employed in the present invention, includes palladium acetate, palladium propionate, palladium monochloroacetate, and the like.

The alkali salt of fatty acid, which may be used as a component of the present catalyst, includes acetates, propionates and chloroacetates of lithium, sodium, potassium, rubidium and cesium. The alkali salt of fatty acid may be added in such an amount that the atomic ratio of palladium to alkali metal is in the range of 1,000 to $1/500$, preferably 50 to $1/100$.

As a co-catalyst, there may be used an oxide or fatty acid salt of copper, silver, zinc, cadmium, mercury, uranium, thallium, iron, cobalt, nickel, manganese, chromium, molybdenum or tungsten. The fatty acid salt indicates a salt of acetic, propionic or monochloroacetic acid. The co-catalyst may be used in such an amount that the atomic ratio of palladium in the catalyst to metal atom in the co-catalyst is in the range of 1,000 to $1/500$, preferably 50 to $1/100$. In order to carry the co-catalyst in the form of oxide on a carrier, nickel nitrate, for example, is carried on the carrier and then calcinated in air to form an oxide.

It is convenient that the catalyst of the present invention is supported on a carrier. This is because the palladium used in the catalyst can be recovered and reused. The carrier may be any of those which have heretofore been used in catalytic reactions. Examples of such carriers are silica, alumina, silica-alumina, active carbon and boria. Among these, silica and active carbon are preferable. For supporting a catalyst on the carrier, there may be adopted any of the conventional immersion, mixing and co-precipitation processes. The aforesaid palladium salt of fatty acid or a mixture thereof with an alkali salt of fatty acid is added in the form of a solution prepared in such a manner that in tthe former case, the palladium salt is dissolved directly in a nitrogen-containing compound, while in the latter case, the palladium salt is dissolved in a nitrogen compound either simultaneously or alternately with the said alkali salt. The same is the case with the aforesaid co-catalyst. The above-mentioned nitrogen-containing compound includes heterocyclic compounds such as pyridine; organic amines such as ethylamine and aniline; organic nitriles such as acetonitrile and benzonitrile; and ammonia. When such nitrogen-containing compound is used, the amount of chlorobenzaldehyde, which is an oxide of chlorostyrene, is greatly decreased to increase the selectivity of the present process. Such effect cannot be attained if there is used an oxygen-containing compound such as water, methanol or acetic acid.

Differences in reaction results, obtained in the cases where there were used the aforesaid palladium salt of fatty acid, a mixture thereof with the aforesaid alkali salt of fatty acid, catalysts prepared by supporting them on carriers, and there was varied the manner of supporting the catalysts on carriers, are shown in Table 1.

TABLE 1

| Run | Catalyst [amount used] | Reaction results [1] after— | | |
|---|---|---|---|---|
| | | 5 hrs. | 15 hrs. | 25 hrs. |
| 1 | $Pd^{II}(OAc)_2$ [0.2 g.] | Chlorostyrene (o+p) 40%. | Chlorostyrene (o+p) 30%. | |
| 2 | $Pd^{II}(OAc)_2$ [0.2 g.]; NaOAc [0.2 g.] | Chlorostyrene (o+p) 85%. | Chlorostyrene (o+p) 74%. | |
| 3 | [$Pd^{II}(OAc)_2$ [0.2 g.]; $SiO_2$]$NH_4OH$[2] [10 cc.] | Chlorostyrene (o+p) 120%. | Chlorostyrene (o+p) 260%. | Chlorostyrene (o+p) 400%. |
| 4 | [$Pd^{II}(OAc)_2$ [0.2 g.]; $Ni^{II}(OAc)_2$ [0.1 g.]; $SiO_2$] $NH_4OH$ [10 cc.] | Chlorostyrene (o+p) 290%. | Chlorostyrene (o+p) 480%. | Chlorostyrene (o+p) 630%. |
| 5 | [$Pd^{II}(OAc)_2$ [0.1 g.]; $Ni^{II}O$ [0.2 g.]; $SiO_2$]$NH_4OH$ (10 cc.); NaOAc [0.1 g.]. | Chlorostyrene (o+p) 420%. | Chlorostyrene (o+p) 690%. | Chlorostyrene (o+p) 780%. |

[1] Reaction results per fed Pd.
[2] Catalyst treating method: Run 4—The catalyst components (palladium acetate and nickel acetate) were dissolved in ammonia water, and then carried on a carrier. Run 5—Nickel nitrate was previously supported on a carrier, calcinated at 500° C. to convert into the form of oxide, and then palladium acetate and sodium acetate were deposited thereon.

NOTE.—Reaction conditions: (100 cc. autoclave; temp. 150° C.; $C_2H_4/O_2=10$ K/30 K (K=kg./cm.²); Cl/AcOH=50 cc./50 cc.).

Table 1 shows the following:

That is, chlorostyrenes are formed even when palladium acetate is used alone, but the yield based on Pd are not more than 40%. Further, even if palladium acetate is used together with sodium acetate, the yield of the chlorostyrene based on Pd is not more than 85%. Thus, in the above cases, the palladium acetate merely acts as a reactant. However, in Run 3, where the palladium acetate had been supported on a carrier, the amount of the resulting chlorostyrene increased to 400% based on the amount of palladium, and thus it is clear that the palladium had recycled. Further, in each of Runs 4 and 5, where nickel compound was additionally used as a promoter, the catalyst was greatly increased in initial activity and the yield based on the amount of palladium reached 780%.

Table 2 shows the effects of catalyst component-treating agents (water, acetic acid, methanol and nitrogen-containing compound). From Table 2, it is understood that the use of nitrogen-containing compound as such treating agent increases the selectivity.

hydes are by-produced in large quantities. It is therefore desirable that the acid is used in such an amount that the weight ratio of starting chlorobenzene to acid becomes less than ½.

The present process can be effected at a temperature of 30° to 400° C. Preferably, the temperature is within the range of 50° to 250° C. The reaction may be carried out either at atmospheric or under pressure. Any of the gas phase or the liquid phase may be employed in the present process. Further, the reaction may be carried out in any of batch-wise or continuous manner.

The present invention is illustrated in further detail below with reference to examples. Examples 1–3 relate to the process of the invention without a catalyst carrier, while the remaining examples employ various carriers according to the invention.

EXAMPLE 1

A 100 cc., three-necked flask was equipped with a reflux cooler and a thermometer. Into this flask was

TABLE 2

| Run | Catalyst [amount used] | Treating agent, 10 cc. | Reaction results [1] after 25 hrs. | | Selectivity [2] |
|---|---|---|---|---|---|
| | | | o plus p Chlorostyrenes | o plus p Chlorobenzaldehydes | |
| 6 | [$Pd^{II}(OAc)_2$ [0.1 g.]; $Mo^{II}O$ [0.2 g.] $SiO_2$] [10 cc.] | $H_2O$ | 320% | 205% | 61% |
| 7 | Same as above | $CH_3OH$ | 405% | 155% | 72% |
| 8 | do | $CH_3COOH$ | 510% | 180% | 74% |
| 9 | do |  | 740% | 85% | 90% |
| 10 | do | $NH_4OH$ | 430% | 10% | 97% |
| 11 | do | $CH_3CN$ | 680% | 60% | 92% |

[1] Yield per fed Pd.

[2] $Selectivity = \dfrac{Y\ Cl-ST}{Y\ Cl-ST + Y\ Cl-BA} \times 10_2$

NOTE.—Reaction conditions: (100 cc. microbomb; temp. 150° C.; $C_2H_4/O_2=10$ K/30 K(K=Kg./cm.²); Cl/AcOH=50 cc./5 cc.).

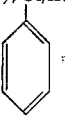

The manner of preparation of catalyst is same as in Run 5 of Table 1.

In practicing the process of the present invention, the presence of an acid is desirable for acceleration of the reaction rate. Such acid includes acetic, propionic and the like lower saturated fatty acids. If the amount of acid used is excessively large, however, fatty acid esters and aldecharged a mixture comprising 50 cc. of chlorobenzene and 647 mg. of palladium acetate. A gas-introducing pipe was attached to the flask, and the temperature was elevated to 80° C. Into the flask were introduced ethylene and oxygen at rates of 30 cc./min. and 20 cc./min., respectively.

In the above manner, the reaction was continued for 10 hours to obtain o-chlorostyrene and p-chlorostyrene in yields of 2% and 8%, respectively, based on the amount of the palladium.

EXAMPLE 2

Into the same flask as in Example 1 was charged a mixture comprising 50 cc. of o-chlorobenzene, 10 cc. of acetic acid, 500 mg. of palladium acetate and 800 mg. of sodium acetate. After elevating the temperature to 110° C., ethylene and oxygen were introduced into the flask at rates of 30 cc./min. and 15 cc./min., respectively.

In the above manner, the reaction was continued to obtain 3,4-dichlorostyrene in a yield of 23% based on the amount of the palladium.

EXAMPLE 3

Into the same flask as in Example 1 was charged a mixture comprising 20 g. of 1,2,4-trichlorobenzene, 10 cc. of acetic acid, 500 mg. of palladium acetate and 500 mg. of sodium acetate. After elevating the temperature to 120° C., ethylene and oxygen were introduced into the flask at rates of 50 cc./min. and 30 cc./min., respectively.

In the above manner, the reaction was continued for 5 hours to obtain 2,4,5-trichlorostyrene in a yield of 8% based on the amount of the palladium.

EXAMPLE 4

0.1 g. of palladium acetate and 0.2 g. of sodium acetate were dissolved in aqueous ammonia. To this solution was added 10 cc. of granular silica gel, and the resulting mixture was vaporized to dryness over a water bath to prepare a catalyst. 10 cc. of the thus prepared catalyst, 50 cc. of monochlorobenzene and 5 cc. of acetic acid were sealed in a 100 cc. microbomb. Through a valve at the top of the bomb, ethylene and oxygen were introduced to pressures of 10 kg./cm.$^2$ and 30 kg./cm.$^2$, respectively. This bomb was placed in a shaking type oil bath kept at 150° C., and reaction was effected for 5 hours. The reaction liquid was subjected to analysis to find that the amounts of p-chlorostyrene and o-chlorostyrene formed were 120% and 50%, respectively, based on the amount of the palladium. After the analysis, the liquid was returned to the bomb, and the reaction was continued for additional 20 hours, while re-introducing ethylene and oxygen to the definite pressures. According to the results of analysis carried out after the reaction, the amounts of p-chlorostyrene and o-chlorostyrene formed were 310% and 130%, respectively, based on the amount of the palladium. Other by-products were scarcely detected.

Comparative example

In the same manner as in Example 4, a mixture comprising 0.1 g. of palladium acetate, 0.2 g. of sodium acetate, 50 cc. of monochlorobenzene and 5 cc. of acetic acid was sealed in a microbomb. Into the bomb, ethylene and oxygen were introduced to pressures of 10 kg./cm.$^2$ and 30 kg./cm.$^2$, respectively, and reaction was effected at 150° C. for 5 hours. As the result, the amounts of p-chlorostyrene and o-chlorostyrene formed were 65% and 25%, respectively, based on the amount of the palladium. Thereafter, the reaction liquid was further reacted for additional 20 hours in the same manner as in Example 4, but no increase in yields of p-chlorostyrene and o-chlorostyrene was observed.

EXAMPLES 5-13

Using the same apparatus and process as in Example 4, various catalysts prepared in the same manner as in Example 4 were tested to obtain the results set forth in Table 3. In Table 3, the amount of each product is represented by the yield thereof based on the amount of the palladium used.

TABLE 3

| Example | Feeding conditions | | | | | | Reaction tempera-ture, °C. | Reaction results | | |
|---|---|---|---|---|---|---|---|---|---|---|
| | Catalyst [amount used, g.] | Carrier [amount used, cc.] | Kind of chlorobenzene [cc.] | Acetic acid, cc. | C$_2$H$_4$/O$_2$ kg./cm.$^2$ | | | Product | After 5 hrs., percent | After 25 hrs., percent |
| 5 | Palladium acetate [0.2]; potassium acetate [0.5] | Active carbon [20] | Monochlorobenzene [50] | 5 | 10/30 | | 150 | p-Chlorostyrene | 160 | 290 |
| | | | | | | | | o-Chlorostyrene | 70 | 160 |
| 6 | Palladium chloroacetate [0.1]; lithium acetate [0.3] | Silica [10] | do | 5 | 15/40 | | 160 | p-Chlorostyrene | 130 | 250 |
| | | | | | | | | o-Chlorostyrene | 40 | 90 |
| 7 | Palladium dichloroacetate [0.1]; sodium acetate [0.2] | Active carbon [10] | o-Dichlorobenzene [30] | 10 | 10/30 | | 150 | 3,4-dichlorostyrene | 60 | 180 |
| 8 | Palladium acetate [0.1]; cesium acetate [0.1] | do | do | 10 | 20/60 | | 150 | do | 120 | 270 |
| 9 | Palladium acetate [0.2]; lithium acetate [0.3] | α-Alumina [20] | m-Dichlorobenzene [20] | 10 | 10/30 | | 160 | 2,4-dichlorostyrene | 75 | 120 |
| 10 | Palladium acetate [0.1]; rubidium acetate [0.1] | Silica [10] | do | 10 | 10/30 | | 160 | do | 110 | 260 |
| 11 | Palladium acetate [0.1]; sodium chloroacetate [0.1] | Active carbon [10] | 1,2,4-trichlorobenzene [30] | 10 | 10/30 | | 140 | 2,4,5-trichlorostyrene | 50 | 110 |
| 12 | Palladium acetate [0.1]; sodium acetate [0.2] | Silica [10] | Dichlorobenzene [20] plus p-dichlorobenzene [10]. | 10 | 10/30 | | 160 | 3,4-dichlorostyrene | 190 | 360 |
| | | | | | | | | 2,5-dichlorostyrene | 80 | 170 |
| 13 | Palladium acetate [0.2] | Active carbon [20] | o-Dichlorobenzene [30] | 5 | 20/60 | | 150 | 3,4-dichlorostyrene | 75 | 115 |

EXAMPLE 14

0.2 g. of palladium acetate and 0.5 g. of manganese acetate were dissolved in pyridine. To this solution was added 20 cc. of silica gel, and the resulting mixture was vaporized to dryness over a water bath to prepare a catalyst. 20 cc. of the thus prepared catalyst, 50 cc. of monochlorobenzene and 5 cc. of acetic acid were sealed in a 100 cc. microbomb. Through a valve at the top of the bomb, ethylene and oxygen gas were introduced to pressures of 10 kg./cm.$^2$ and 30 kg./cm.$^2$, respectively. This bomb was placed in a shaking type oil bath kept at 150° C., and reaction was effected for 5 hours. The reaction liquid was subjected to analysis to find that the amounts of p-chlorostyrene and o-chlorostyrene formed were 230% and 85%, respectively, based on the amount of the palladium. After the analysis, the liquid was returned to the bomb, and the reaction was further continued for additional 20 hours, while introducing ethylene and oxygen to the definite pressures. According to the results of analysis carried out after the reaction, the amounts of p-chlorostyrene and o-chlorostyrene increased to 490% and 180%, respectively, based on the amount of the palladium. Other by-products were scarcely detected.

Comparative example

In the same manner as in Example 14, 0.2 g. of palladium acetate, 0.5 g. of manganese acetate, 50 cc. of monochlorobenzene and 5 cc. of acetic acid were charged into a microbomb. Into the bomb, ethylene and oxygen were introduced in the same manner as in Example 14 to pressures of 10 kg./cm.$^2$ and 30 kg./cm.$^2$, respectively, and reaction was effected at 150° C. for 5 hours. As the result, the amounts of p-chlorostyrene and o-chlorostyrene formed were 70% and 25%, respectively, based on the amount of the palladium. Thereafter, the reaction liquid was further reacted for additional 20 hours in the same manner as in Example 14, but no increase in yields of p-chlorostyrene and o-chlorostyrene was observed.

EXAMPLE 15

0.1 g. of palladium monochloroacetic acid, 0.2 g. of copper acetate and 0.2 g. of potassium acetate were dissolved in pyridine. To this solution was added 10 cc. of granular active carbon, and the resulting mixture was vaporized to dryness to prepare a catalyst. 10 cc. of the thus prepared catalyst, 50 cc. of o-dichlorobenzene and 10 cc. of acetic acid were sealed in a 100 cc. microbomb. Into the bomb, ethylene and oxygen were introduced in the same manner as in Example 14 to pressures of 10 kg./cm.$^2$ and 20 kg./cm.$^2$, respectively. After elevating the temperature to 160° C., reaction was effected for 2 hours, whereby 3,4-dichlorostyrene was formed in a yield of 120% based on the amount of the palladium. When the reaction was further continued for additional 15 hours, the yield of 3,4-dichlorostyrene increased to 360%.

Comparative example

In the same manner as in Example 15, 0.1 g. of palladium monochloroacetic acid and 0.2 g. of potassium acetate were supported on 10 cc. of active carbon to prepare a catalyst. 10 cc. of this catalyst, 50 cc. of o-dichlorobenzene and 10 cc. of acetic acid were charged into a 100 cc. microbomb. Into the bomb, ethylene and oxygen were introduced in the same manner as in Example 15 to pressures of 10 kg./cm.$^2$ and 20 kg./cm.$^2$, respectively. After elevating the temperature to 160° C., reaction was effected for 2 hours. As the result, 3,4-dichlorostyrene was formed in an amount of 50% based on the amount of the palladium. The reaction was further continued for additional 15 hours, whereby the amount of 3,4-dichlorostyrene increased to 170%.

EXAMPLE 16

4 g. of ammonium molybdate was dissolved in water. To this solution was added 20 cc. of granular alumina,

TABLE 4

| Example | Catalyst [g.] | Carrier [cc.] | Feeding conditions | | Reaction temperature, °C. | Yields of styrenes, percent | | Remarks |
|---|---|---|---|---|---|---|---|---|
| | | | Amount of chlorobenzene, cc. | Amount of acetic acid, cc. | C$_2$H$_4$/O$_2$, kg./cm.$^2$ | | | |
| | | | | | | After 5 hrs. | After 25 hrs. | |
| 17 | Palladium acetate [0.1]; nickel acetate [0.2] | Molybdenum oxide-silica [10] | 50 | 10 | 10/30 | 150 | o-210 p-700 | o-350 p-960 | 0.5 mol of manganese nitrate was supported on 1 liter of silica and calcinated at 500° C. for 3 hours. |
| 18 | Palladium acetate [0.1]; uranium acetate [0.1] | Cadmium oxide-silica [10] | 50 | 5 | 10/30 | 150 | o-110 p-250 | o-190 p-850 | 0.2 mol of cadmium nitrate was supported on 1 liter of silica and calcinated at 500° C. for 5 hours. |
| 19 | Palladium acetate [0.1]; nickel acetate [0.1]; sodium acetate [0.1]. | Silica [10] | 50 | 10 | 10/30 | 150 | o-80 p-340 | o-120 p-600 | |
| 20 | Palladium acetate [0.1]; lithium acetate [0.1] | Iron oxide silica [10] | 20 | 5 | 10/30 | 150 | o-60 p-230 | o-110 p-380 | 0.05 mol of iron nitrate was supported on 1 liter of silica and calcinated at 500° C. for 5 hours. |
| 21 | Palladium acetate [0.2]; silver acetate [0.1] | Tungsten oxide-silica [10] | 20 | 2 | 10/30 | 150 | o-75 p-105 | o-100 p-185 | 0.1 mol of ammonium tungstate was supported on 1 liter of silica and calcinated at 500° C. for 2 hours. |
| 22 | Palladium acetate [0.1]; mercury acetate [0.1] | Molybdenum oxide-silica [20] | 50 | 10 | 20/60 | 150 | o-45 p-90 | o-65 p-120 | Same as in Example 17. |
| 23 | Palladium acetate [0.3]; cobalt acetate [0.2] | Active carbon [20] | 50 | 5 | 10/30 | 120 | o-130 p-560 | o-230 p-920 | |
| 24 | Palladium acetate [0.1] | Thallium oxide-silica [10] | 50 | 10 | 20/60 | 160 | o-75 p-200 | o-125 p-350 | 0.1 mol of thallium acetate was supported on 1 liter of silica and calcinated at 300° C. for 10 hours. |
| 25 | Palladium acetate [0.1]; Thallium acetate [0.2] | Chromium oxide-silica [10] | 50 | 5 | 20/60 | 130 | o-35 p-95 | o-70 p-190 | 0.1 mol of chromic anhydride was supported on 1 liter of silica and calcinated at 500° C. for 2 hours. |
| 26 | Palladium acetate [0.2]; uranium acetate [0.2] | Alumina[10] | 50 | 5 | 10/20 | 180 | o-40 p-85 | o-70 p-160 | |
| 27 | Palladium acetate [0.1] | Zinc oxide-alumina [10] | 50 | 5 | 10/30 | 150 | o-35 p-105 | o-95 p-260 | 0.5 mol of zinc nitrate was supported on 1 liter of alumina and calcinated at 800° C. for 10 hours. |
| 28 | Palladium dichloroacetate [0.1]; cesium acetate [0.1]; cadmium acetate [0.1]. | Active carbon [10] | 50 | 5 | 10/30 | 100 | o-90 p-150 | o-120 p-300 | |
| 29 | Palladium acetate [0.1]; rubidium acetate [0.1] | Manganese oxide-silica [20] | 30 | 5 | 10/30 | 130 | o-110 p-240 | o-205 p-403 | Same as in Example 17. | tate, chloroacetate, propionate, or oxide of a non-alkali metal selected from the group consisting of copper, silver, to form a molybdenum oxide on the alumina. 20 cc. of this alumina supporting the molybdenum oxide was added to a pyridine solution containing 0.2 g. of palladium acetate and 0.2 g. of lithium acetate, and the resulting mixture was vaporized to dryness to prepare a catalyst. 10 cc. of the thus prepared catalyst, 20 cc. of 1,2,4-trichlorobenzene and 5 cc. of acetic acid were charged into a 100 cc. microbomb. Into the bomb, ethylene and air were introduced in the same manner as in Example 14 to pressures of 10 kg./cm.$^2$ and 60 kg./cm.$^2$, respectively. Subsequently, the mixture was reacted for 2 hours in a shaking type oil bath kept at 170° C. As the result, 2,4,5-trichlorostyrene was obtained in a yield of 90% based on the amount of the palladium. The reaction was further continued for additional 20 hours, whereby the yield of 2,4,5-trichlorostyrene increased to 170%.

EXAMPLES 17–29

Using the same apparatus and process as in Example 14, various catalysts prepared in the same manner as in Example 14 were tested to obtain the results set forth in Table 4, Col. 8. In Table 4, the yields of chlorostyrenes were represented by yields based on the amount of the palladium used. As to catalysts prepared by use of co-catalysts, the column "Remarks" of Table 4 shows the treating conditions thereof.

EXAMPLE 30

5 g. of palladium acetate and 10 g. of copper acetate were dissolved in pyridine. To this solution was added 500 cc. of silica gel, and the resulting mixture was vaporized to dryness to prepare a catalyst. 20 cc. of the thus prepared catalyst was charged into a hard glass-made reaction tube, which was then placed in an electric furnace kept at 180° C. Into this reaction tube was introduced at a flow rate of 100 cc./min. a gas mixture comprising ethylene, monochlorobenzene, acetic acid and oxygen in a molar ratio of 1:1:0.2:0.5. After 2 hours from the initiation of reaction, a mixture of o- and p-chlorostyrenes was formed in a single flow yield of 6.6% based on the amount of the chlorobenzene. As by-products, more or less amounts of vinyl acetate and carbon dioxide were detected.

What we claim is:

1. A process for selectively preparing a mixture of monochlorostyrenes, a dichlorostyrene, a trichlorostyrene, or a mixture thereof which comprises reacting at a temperature of 30° to 400° C. a corresponding monochlorobenzene, dichlorobenzene, trichlorobenzene or mixtures thereof with ethylene and molecular-oxygen containing gas in the presence of catalyst, the molar ratio of ethylene to oxygen being 10 to 1/100, and said catalyst being selected from the group consisting of a palladium compound selected from the group consisting of palladium acetate, palladium propionate, and palladium monochloroacetate, and a mixture of alkali metal salts of acetic acid, propionic acid or chloroacetic acid with said palladium compound, the atomic ratio of palladium to alkali metal being 1,000 to 1/500, supported on a carrier selected from the group consisting of silica, alumina, silica-alumina, active carbon, and boria, or on said carrier incorporated with a co-catalyst selected from the group consisting of an acetate, chloroacetate, propionate, or oxide of a non-alkali metal selected from the group consisting of copper, silver, zinc, cadmium, mercury, uranium, thallium, iron, cobalt, nickel, manganese, chromium molybdenum and tungsten, said catalyst being supported on the carrier or on the carrier incorporated with said co-catalyst by adding the catalyst dissolved in a nitrogen containing compound selected from the group consisting of pyridine, ethylamine, aniline, acetonitrile, benzonitrile, and ammonium hydroxide to the carrier or on the carrier incorporated with said co-catalyst, and drying the atomic ratio of palladium in the catalyst to the non-alkali metal in the co-catalyst being 1,000 to 1/500.

2. A process according to claim 1, wherein said catalyst is supported on the carrier incorporated with said co-catalyst.

3. A process according to claim 1, wherein the atomic ratio of palladium in said catalyst to the non-alkali metal in the co-catalyst is 50 to 1/100.

4. A process according to claim 1, wherein the reaction is effected at a temperature in the range of 50° to 250° C.

5. A process according to claim 1, wherein the reaction is effected in a gas phase.

6. A process according to claim 1, wherein the reaction is effected in a liquid phase.

7. A process according to claim 1, wherein monochlorobenzene is reacted to produce a mixture of o- and p-chlorostyrene.

8. A process according to claim 1, wherein o-dichlorobenzene is reacted to produce 3,4-dichlorostyrene.

9. A process according to claim 1, wherein m-dichlorobenzene is reacted to produce 2,4-dichlorostyrene.

10. A process according to claim 1, wherein 1,2,4-trichlorobenzene is reacted to produce 2,4,5-trichlorostyrene.

11. A process according to claim 1, wherein a mixture of o-dichlorobenzene and p-dichlorobenzene is reacted to produce a mixture containing 3,4-dichlorostyrene and 2,5-dichlorostyrene.

12. A process according to claim 1, wherein said co-catalyst is incorporated in said carrier by adding the acetate, chloroacetate, or propionate of said non-alkali metal dissolved in a nitrogen containing compound selected from the group consisting of pyridine, ethylamine, aniline, acetonitrile, benzonitrile and ammonium hydroxide.

13. A process according to claim 1, wherein the oxide co-catalyst is incorporated in said carrier by adding a nitrate of said non-alkali metal and thereafter calcining the carrier to form said oxide.

14. A process according to claim 1 wherein the alkali metal is lithium, sodium, potassium, rubidium and cesium.

15. A process according to claim 1 wherein atomic ratio of palladium to alkali metal in the catalyst is 50 to 1/100.

References Cited

UNITED STATES PATENTS

| | | | |
|---|---|---|---|
| 3,412,136 | 11/1968 | McClain et al. | 252—431 C |
| 3,479,392 | 11/1969 | Stern et al. | 260—497 |

FOREIGN PATENTS

| | | | |
|---|---|---|---|
| 1,576,819 | 6/1969 | France | 260—650 |

HOWARD T. MARS, Primary Examiner

U.S. Cl. X.R.

252—426, 438, 439